United States Patent [19]

Hasstedt

[11] Patent Number: 4,634,169

[45] Date of Patent: Jan. 6, 1987

[54] VEHICLE SEAT

[76] Inventor: Kenneth L. Hasstedt, 1812 Forest Ave., Des Moines, Iowa 50315

[21] Appl. No.: 737,789

[22] Filed: May 28, 1985

[51] Int. Cl.$^4$ .............................................. B60R 21/10
[52] U.S. Cl. .................................... 296/65 A; 297/216
[58] Field of Search .......................... 296/65 A, 65 R; 297/216; 180/274

[56] References Cited

U.S. PATENT DOCUMENTS

| | | | |
|---|---|---|---|
| 2,102,979 | 12/1937 | Smith | 297/216 |
| 2,823,730 | 2/1958 | Lawrence | 297/216 |
| 3,184,266 | 12/1962 | Schliephacke | 297/325 |
| 3,463,543 | 8/1967 | Zellar | 297/216 |
| 3,697,128 | 10/1972 | Strien et al. | 297/216 |
| 3,998,291 | 12/1976 | Davis | 180/294 |
| 4,085,963 | 4/1978 | Bullerdieck | 296/65 A |

FOREIGN PATENT DOCUMENTS 1430028  3/1969  Fed. Rep. of Germany ... 296/65 A

Primary Examiner—Robert R. Song
Attorney, Agent, or Firm—Zarley, McKee, Thomte, Voorhees & Sease

[57] ABSTRACT

An improved motor vehicle is provided for minimizing personal injuries resulting from collisions. The vehicle has a floor with a recessed area therein and a passenger seat mounted on the floor above the recessed area thereof. The seat includes a seat portion and a back portion. Front and rear braces are pivotally connected at their respective opposite ends to the seat and to the vehicle body or frame. Upon impact, the momentum of the occupied seat pivots the seat from an upright driving position above the recessed area to a reclined impact position within the recessed area such that the impact forces are absorbed by the seat portion of the seat.

15 Claims, 5 Drawing Figures

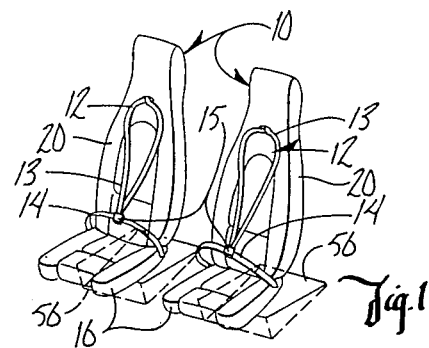
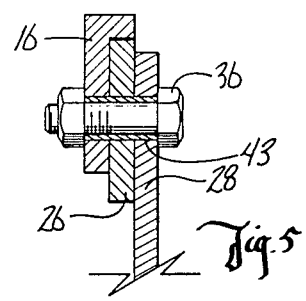
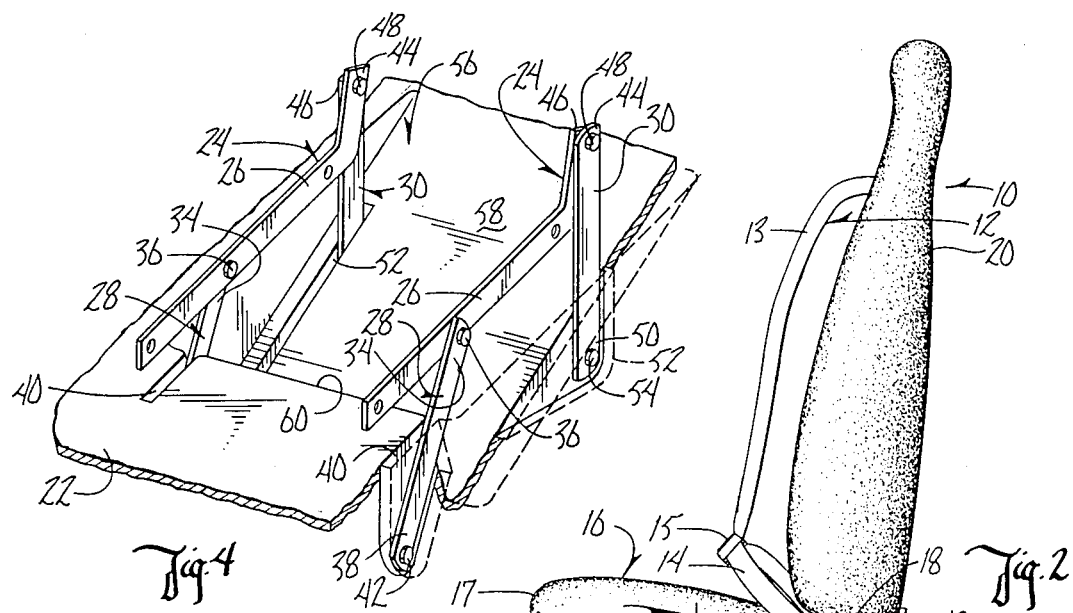
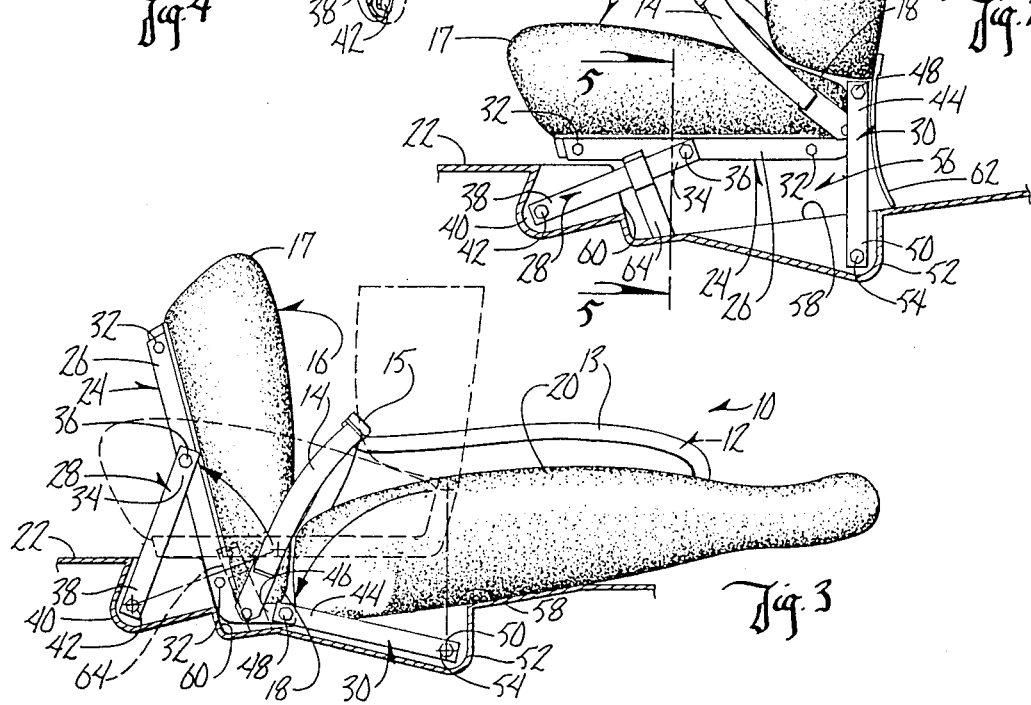

VEHICLE SEAT

BACKGROUND OF THE INVENTION

Personal injuries resulting from motor vehicle accidents are common and costly. While the use of seat belts usually reduces the extent of personal injuries, seat belts are not totally satisfactory. First of all, an occupant in a vehicle must consciously choose to utilize the seat belt. Secondly, many seat belts are uncomfortable. Finally, even with seat belts, a person's upper body is subjected to the forces of momentum and inertia when involved in a sudden impact collision, thus causing injuries such as whip lash.

Air bags which automatically inflate from the dashboard of the vehicle have been proposed as an alternative to seat belts. However, for various reasons, there has been much opposition to the air bag proposals.

Therefore, a primary objective of the present invention is the provision of an improved worthy seat for a motor vehicle which will protect the occupant from injuries in the event of a collision.

Another objective of the present invention is the provision of a vehicle seat which automatically reclines to a shock absorbing position upon sudden stopping of the vehicle.

A further objective of the present invention is the provision of a crash worthy vehicle seat which transfers the forces of momentum and inertia from the occupant's upper body to the occupant's hip area.

Still another objective of the present invention is the provision of an improved motor vehicle having a recessed area in the floor into which the vehicle seat pivots in the event of a collision.

A further objective of the present invention is the provision of an improved crash worthy motor vehicle having a seat mounted on pivotable support brackets such that the seat is automatically reclined upon sudden stopping of the vehicle such that the force of impact is into the cushioned seat portion of the vehicle seat.

Another objective of the present invention is the provision of a bracket assembly for pivotally mounting a vehicle seat in the vehicle which is adapted for use on all vehicle seats.

Another objective of the present invention is the provision of a seat mounting assembly for improving the crash worthiness of a vehicle which is economical to manufacture and durable and effective in use.

BRIEF DESCRIPTION OF THE DRAWINGS

FIG. 1 is a perspective view of a pair of seats mounted in a vehicle in accordance with the present invention.

FIG. 2 is a side elevational view of a seat mounted in a vehicle according to the present invention and being in the upright driving position.

FIG. 3 is a side elevational view showing in solid lines the seat reclined to an impact position from the upright driving position represented by dotted lines.

FIG. 4 is a perspective view showing the bracket assembly of the present invention for mounting the seat in the vehicle.

FIG. 5 is a sectional view taken along lines 5—5 of FIG. 2.

DETAILED DESCRIPTION OF THE DRAWINGS

In the drawings, a conventional vehicle seat is generally designated by the reference numeral 10. While the drawings show a bucket seat, it is understood that seat 10 may be any type of seat, including bench, split bench, or otherwise. Seat belts 12 are provided on each seat 10 and are similar to those found in military aircraft. More particularly, seat belts 12 have a double stitched strap portion (not shown) anchored in seat 10 which exits the seat adjacent the headrest so as to be positioned adjacent the occupant's upper back or lower neck. The double stitched portion splits into two shoulder straps 13 which extend over the occupant's shoulders and are secured to opposite lap straps 14 with a single buckle 15. All the straps are released simultaneously by disengagement of buckle 15 in a known manner. Seat 10 generally includes a seat portion 16 having a forward edge 17 and a rearward edge 18 and a back portion 20 connected to seat portion 16 adjacent the rearward edge thereof.

Seat 10 is mounted to the floor 22 of a vehicle by a pair of bracket assemblies 24 positioned on either side of the seat and constructed of any suitable high-strength material. Each bracket assembly 24 includes a side brace 26, a front brace 28 and a rear brace 30. Side brace 26 is secured to the side of seat portion 16 in any convenient manner, such as by fasteners 32.

Front brace 28 has a first end 34 pivotally connected to side brace 26 by fastening means 36 and a second end 38 extending through a slot 40 in floor 22 and being pivotally connected to the body or frame of the vehicle by fastening means 42. As seen in FIG. 5, fastening means 36 extends through a bushing 43 in front brace 28, side brace 26 and seat portion 16.

Rear brace 30 has a first end 44 pivotally connected to an upwardly extending portion 46 of side brace 26 adjacent back portion 20 by any convenient fastening means 48. Rear brace 30 has a second end 50 extending through a slot 52 and floor 22 and is pivotally connected to the vehicle body or frame by a fastening means 54. A bushing similar to bushing 43 is also provided for fastening means 48.

It is understood that side brace 26 can be eliminated, with the first ends 34 of front brace 28 and first end 44 of rear brace 30 being pivotally connected directly to seat 10. It is also understood that conventional slide elements can be provided in seat 10 so as to permit forward and rearward adjustment of the seat without interfering with the operation of bracket assemblies 24, which will be described hereinafter. Alternately, side braces 26 may be the guide track portion of the seat side elements and fasteners 32 may include rollers to permit such seat adjustment. Furthermore, back portion 20 may be reclined with respect to seat portion 16 in a conventional manner and seat portion 16 may be raised and lowered by conventional means without interfering with the safety operation of the seat.

As seen in the Figures, floor 22 has a recessed area 56 above which seat 10 is mounted. More particularly, forward edge 17 of seat portion 16 may be supported by floor 22 while the rearward edge 18 of seat portion 16 is spaced above recessed area 56 when the seat is in an upright driving position, as shown in FIG. 2. Upon collision or sudden stopping of the vehicle, the momentum of the occupied seat causes front brace 28 and rear brace 30 to pivot about their respective second ends, such that seat 10 is reclined into an impact position within recessed area 56. Such pivotal movement of seat 10 will occur automatically, regardless of the weight of the occupant. Thus, the impact forces and momentum of the occupant are absorbed by cushioned seat portion 16 rather than other parts of the vehicle, such as the steering wheel or dashboard. Also, such reclining of seat 10 into recessed area 56 transfers the impact forces from the occupant's upper body to his hip area and upper legs, thereby eliminating the possibility of whip lash and similar injuries caused in conventional vehicles wherein the seat remains upright. After a collision, seat 10 can be easily pivoted back into the driving position for subsequent use.

It is noted that first end 44 of rear brace 30 is positioned substantially higher than first end 34 of front brace 28 when seat 10 is in the driving position. Such arrangement permits seat 10 to pivot more easily upon impact of the vehicle, since the connection of rear brace 30 to seat 10 is closer to the center of gravity of the occupied seat. It is also noted that upon impact, the momentum of the occupied seat automatically causes the seat to pivot to the reclined position wherein back portion comes to rest upon bottom wall 58 of floor 22 and the bottom rearward portion of seat portion 16 comes to rest on the forward wall 60 of recessed area 56, thereby eliminating undue stresses upon fastening means 42 and 54. Also, the area of contact between seat 10 and floor 22 in the impact position is substantial such that the impact forces are not concentrated in a small region of the seat, but rather are spread over a large area thereby lessening injuries to the occupant.

It is desirable to provide a cover flap 62 on the back of seat 10 to insure that no objects enter recessed area 56 that would inhibit the pivotal movement of seat 10 from the upright driving position to the reclined impact position. Cover flap 62 can be attached to seat 10 in any convenient manner and preferably is releaseably secured to floor 22 by snaps, Velcro or the like. It is understood that other forms of covers for recessed area 56 are also acceptable.

It may also be desirable to provide an anti-pivot clip or strap 64 to prevent pivoting of seat 10 during hard braking or mild impacts. For example, as seen in FIG. 2, clip 64 is fastened to floor 22 and extends over front brace 28 in an upright position during a mild impact and so as to release front brace 28 such that seat 10 will pivot to the impact position in the event of a more severe collision. Alternately, clip 64 may be a wire or rubber member designed to snap or break upon sufficient impact forces.

From the foregoing, it is seen that at least all of the stated objectives are accomplished by the present invention.

What is claimed is:

1. An improved crashworthy motor vehicle having a floor and a passenger seat mounted therein with the seat portion and a back portion, said improvement comprising:
   a pair of front braces each having a first end pivotally connected to said seat portion and a second end pivotally connected to said vehicle;
   a pair of rear braces each having a first end pivotally connected to the rear end of said seat and a second end pivotally connected to said vehicle;
   said floor having a recessed area including an upright front wall and a bottom wall;
   said seat being pivotal by momentum upon sudden stopping of said vehicle from an upright driving position above said recessed area wherein said seat portion is substantially horizontal and said back portion is substantially vertical to a reclined impact position within said recessed area wherein said seat portion is substantially vertical and said back portion is substantially horizontal and wherein said back portion of said seat engages said bottom wall of said recessed area.

2. The vehicle of claim 1 wherein said forward edge of said seat portion is supported by said floor of said motor vehicle and said rearward edge of said seat portion is supported above said recessed area of said floor by said rear brace assembly when said seat is in said driving position.

3. The vehicle of claim 1 wherein said seat portion engages said front wall of said recessed area of said floor when said seat is in said impact position.

4. The vehicle of claim 1 wherein said first and second ends of said first brace and said first end of said second brace are linearly arranged when said seat is in said driving position.

5. The vehicle of claim 1 further comprising a seat harness connected to said seat or strapping an occupant in said seat.

6. The vehicle of claim 1 further comprising a cover means connected at least to said floor of said vehicle for preventing obstacles from entering said recessed area when said seat is in said driving position.

7. The vehicle of claim 1 further comprising mounting means on said floor of said vehicle to which said second ends of said front and rear braces are slidably mounted whereby said seat is adjustable forwardly and rearwardly with respect to said floor.

8. The vehicle of claim 1 wherein said front and rear braces each include a pair of support legs positioned on either side of said safety seat.

9. The vehicle of claim 1 wherein said first ends of said rear braces are connected to said seat at a point higher than the connection point of said first ends of said front braces to said seat.

10. The vehicle of claim 1 wherein said front braces and said rear brace both pivot at least 45° when said seat pivots from said driving position to said impact position.

11. The vehicle of claim 1 wherein a substantial area of said back portion of said seat engages said bottom wall of said recessed area such that the forces of impact are distributed over a large area and thereby prevent damage to the seat.

12. The vehicle of claim 1 wherein said floor of said vehicle has slots through which said front and rear braces extend such that said second ends of said front and rear braces can be secured to said vehicle at a location below said floor.

13. The vehicle of claim 12 wherein said slots are sufficiently large to permit pivoting of said braces therein when said seat pivots from said driving position to said impact position.

14. The vehicle of claim 1 further comprising means attached to said floor and engaging said front braces for preventing pivoting of said seat from said driving position to said impact position, said means disengaging said front braces when subjected to a predetermined force so as to allow pivoting of said seat from said driving position to said impact position.

15. The vehicle of claim 14 wherein said means is a resilient clip extending over each of said front braces.

* * * * *